(12) United States Patent
Kim

(10) Patent No.: US 8,196,714 B2
(45) Date of Patent: Jun. 12, 2012

(54) SINGLE MOTOR ELECTRONIC WEDGE BRAKE SYSTEM GENERATING SOLENOID ASSISTING FORCE

(75) Inventor: Jongsung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 920 days.

(21) Appl. No.: 11/934,183

(22) Filed: Nov. 2, 2007

(65) Prior Publication Data
US 2009/0065311 A1 Mar. 12, 2009

(30) Foreign Application Priority Data
Sep. 12, 2007 (KR) .................. 10-2007-0092579

(51) Int. Cl.
*F16D 55/08* (2006.01)
*F16D 55/14* (2006.01)
*F16D 63/00* (2006.01)

(52) U.S. Cl. .................. 188/72.7; 188/72.2; 188/70 B
(58) Field of Classification Search ............. 188/72.7, 188/72.2, 72.8, 134, 136, 106 P, 70 B, 265
See application file for complete search history.

(56) References Cited

U.S. PATENT DOCUMENTS

| | | | |
|---|---|---|---|
| 6,507,399 B1 * | 1/2003 | Andrieu et al. ............. 356/332 |
| 6,978,868 B2 | 12/2005 | Schautt | |
| 7,552,804 B2 * | 6/2009 | Baumann et al. ............ 188/71.8 |
| 2003/0183790 A1 * | 10/2003 | Ji et al. ................. 251/129.02 |
| 2004/0011981 A1 * | 1/2004 | Ahn ................... 251/129.14 |
| 2004/0013549 A1 | 1/2004 | Ahn | |
| 2004/0262098 A1 * | 12/2004 | Baumann et al. ............ 188/72.8 |
| 2004/0262101 A1 * | 12/2004 | Baumann et al. ............ 188/79.51 |
| 2005/0173206 A1 * | 8/2005 | Reuter et al. ................. 188/72.7 |
| 2006/0112995 A1 | 6/2006 | Kwon | |
| 2007/0227837 A1 * | 10/2007 | Barbosa et al. ............ 188/72.7 |
| 2008/0314695 A1 * | 12/2008 | Kim ........................... 188/72.7 |
| 2009/0071769 A1 * | 3/2009 | Cheon ........................ 188/72.7 |
| 2009/0101453 A1 * | 4/2009 | Baier-Welt et al. ......... 188/72.7 |
| 2010/0012441 A1 * | 1/2010 | Baier-Welt et al. ......... 188/72.7 |

FOREIGN PATENT DOCUMENTS
KR 10-20070065114 6/2007

OTHER PUBLICATIONS

U.S. Appl. No. 11/877,122 to Kim, which was filed on Oct. 23, 2007.
U.S. Appl. No. 11/934,176 to Cheon, which was filed on Nov. 2, 2007.

* cited by examiner

*Primary Examiner* — Bradley King
*Assistant Examiner* — Vishal Sahni
(74) *Attorney, Agent, or Firm* — Greenblum & Bernstein P.L.C.

(57) ABSTRACT

While driving one motor, an electronic wedge brake (EWB) system according to an embodiment of the present invention implements a main braking function by self-energizing caused by a wedge operation. Since only one motor is used, it is possible to reduce the number of parts and to simplify the structure. Further, the electronic wedge brake system implements various functions, such as a function for maintaining a set clearance of a pad, a Fail-Safe function, and an EPB function by using a solenoid interlocked with the NSL (Non-Self Locking) type screw that moves in the axial direction. When the electronic wedge brake system is operated, an axial reaction force transmitted from the pad is dispersed using a frictional force caused by a NSL (Non-Self Locking) type push rod shaft, which reduces a load of a solenoid which constrains a push rod shaft. As a result, a low-performance solenoid may be used.

12 Claims, 10 Drawing Sheets

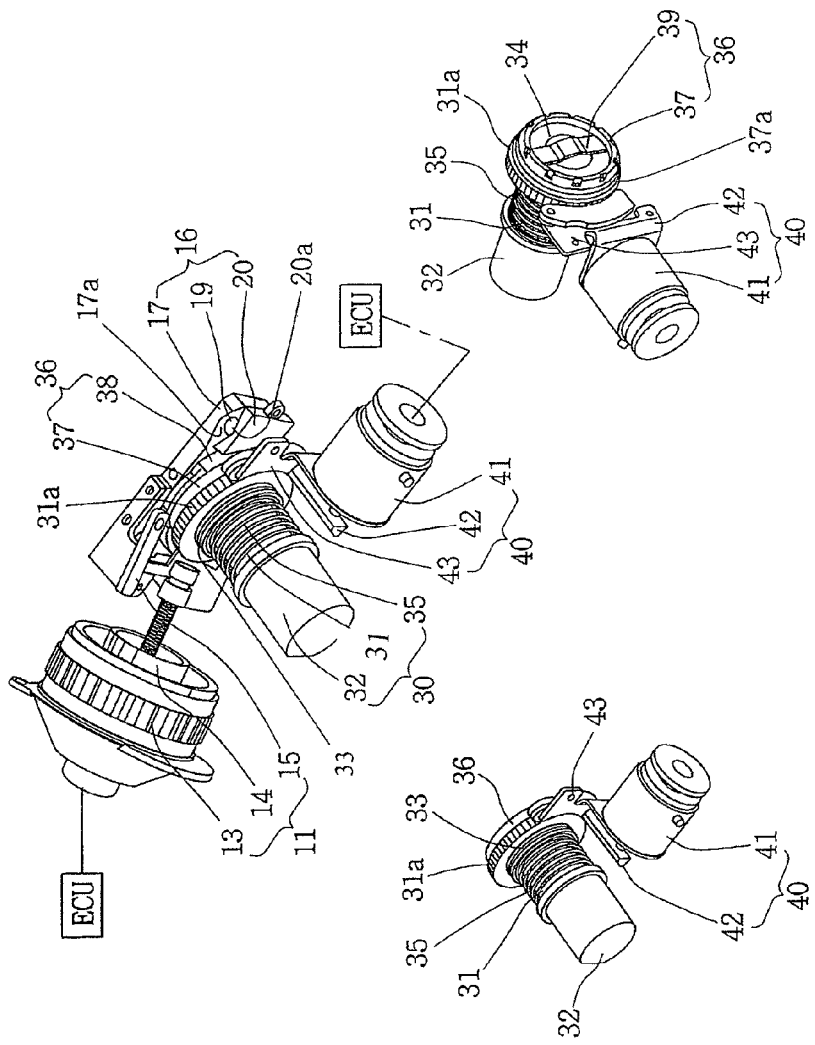

FIG. 3A

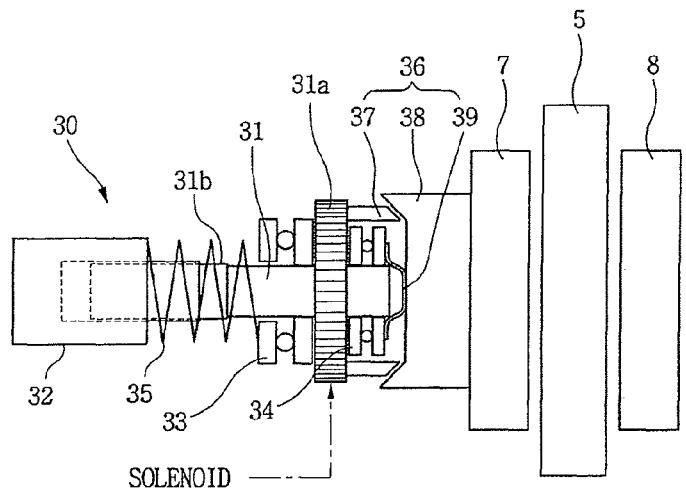

FIG. 3B

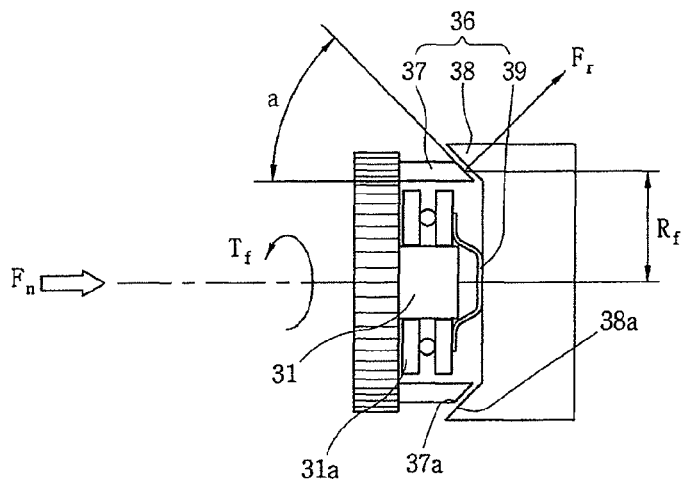

$$F_r = \frac{\Delta F_n}{\sin a} \quad (1)$$

ANGLE WHERE A FRICTIONAL SURFACE IS GENERATED: a
EFFECTIVE RADIUS OF THE FRICTION SURFACE: $R_f$
AXIAL FORCE TO BE ADDITIONALLY APPLIED AFTER A SPRING APPLIES A FORCE: $\Delta F_n$ $$T_f = \mu \frac{\Delta F_n}{\sin a} R_f \quad (2)$$

NORMAL FORCE (REACTION FORCE) TO BE APPLIED TO THE FRICTION SURFACE: $F_r$
TORQUE TO BE APPLIED IN A DIRECTION WHERE ROTATION IS PREVENTED BY A FRICTIONAL FORCE: $T_f$
FRICTION COEFFICIENT OF THE FRICTION SURFACE: $\mu$ $$\Delta T = \Delta F_n (\tan \alpha - \tan \beta) R_s \quad (3)$$

TORQUE CAUSING THE ROTATION BY AN ADDITIONAL FORCE: $\Delta T$ $$T_f > \Delta T$$

FIG. 5A
<INITIAL POSITION>
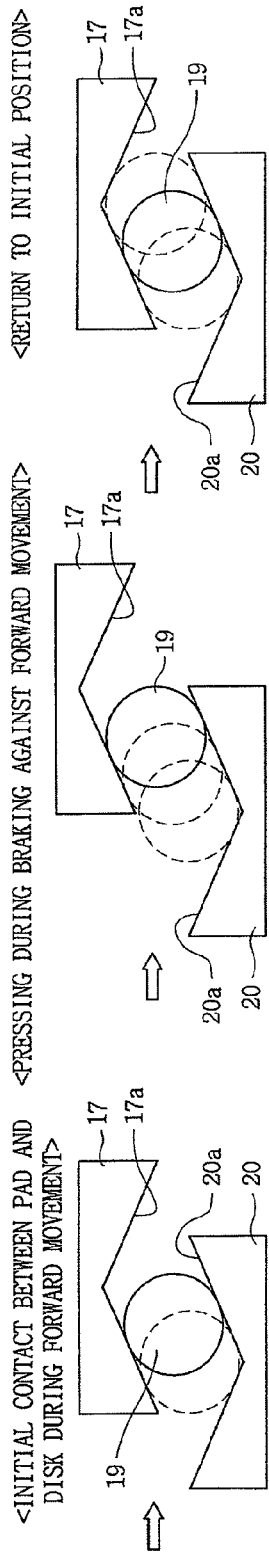
FIG. 5B
<INITIAL CONTACT BETWEEN PAD AND DISK DURING FORWARD MOVEMENT>
FIG. 5C
<PRESSING DURING BRAKING AGAINST FORWARD MOVEMENT>
FIG. 5D
<RETURN TO INITIAL POSITION>
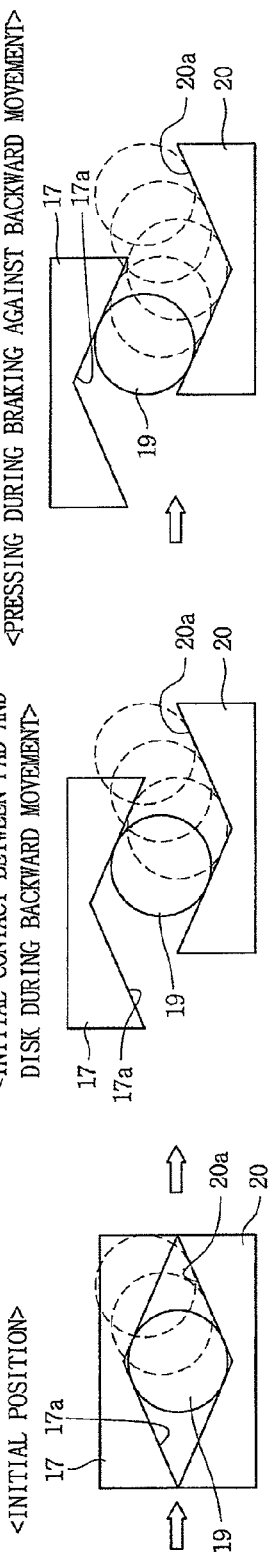
FIG. 5E
<INITIAL POSITION>
FIG. 5F
<INITIAL CONTACT BETWEEN PAD AND DISK DURING BACKWARD MOVEMENT>
FIG. 5G
<PRESSING DURING BRAKING AGAINST BACKWARD MOVEMENT>

<MAIN BRAKING>

<FAIL-SAFE>

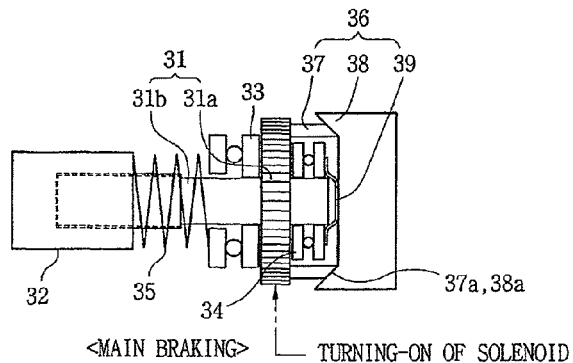
<MAIN BRAKING>  TURNING-ON OF SOLENOID
FIG. 9A
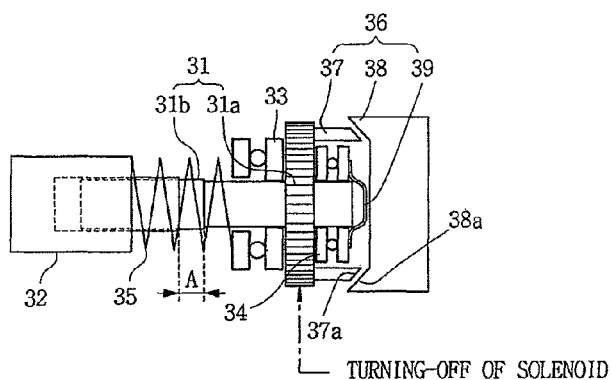 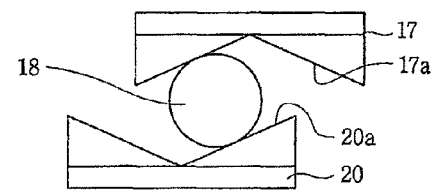
TURNING-OFF OF SOLENOID
<COMPENSATION FOR MAINTAINING
SET CLEARANCE OF PAD>
FIG. 9B
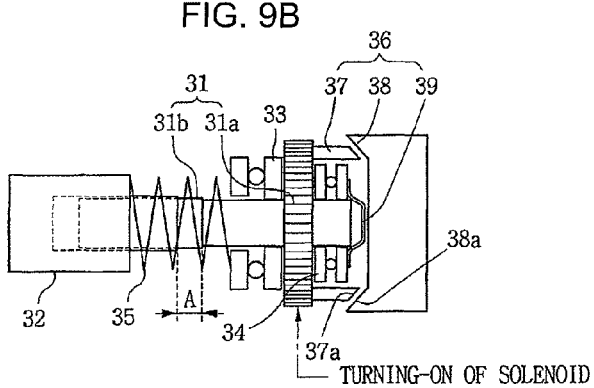 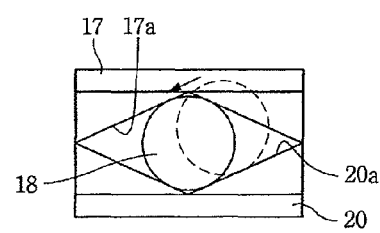
TURNING-ON OF SOLENOID
<COMPLETING COMPENSATION FOR
MAINTAINING SET CLEARANCE OF PAD>
FIG. 9C

MAIN BRAKING

PARKING BRAKING

SINGLE MOTOR ELECTRONIC WEDGE BRAKE SYSTEM GENERATING SOLENOID ASSISTING FORCE

CROSS-REFERENCE TO RELATED APPLICATIONS

The present application is based on, and claims priority from, Korean Application Serial Number 10-2007-0092579, filed on Sep. 12, 2007, the disclosure of which is hereby incorporated by reference herein in its entirety.

FIELD OF THE INVENTION

The present invention relates to a single motor electronic wedge brake system, and more particularly, to a single motor electronic wedge brake system that can reduce a load of a solenoid load by generating solenoid assisting force.

BACKGROUND OF THE INVENTION

In general, a brake system is used to decelerate, stop, or park a moving vehicle.

Among brake systems, an electronic wedge brake system (EWB), which uses an electronically controlled motor as a power source in order to generate a braking force, generates a braking force without using hydraulic pressure. Therefore, the electronic wedge brake system has a simpler structure as compared to a hydraulic pressure brake. Further, the electronic wedge brake system comes into the spotlight as a brake system that can optimally implement various electronic devices and an integrated chassis.

For example, during the braking, self-energizing of a wedge assembly operated by an actuator is performed in the electronic wedge brake (EWB). That is, a wedge is moved due to the drive of the actuator and presses the pad, and a frictional force between the pad and the disk serves as an additional input force. Due to the above-mentioned wedge operation, it is possible to obtain a large braking force for the performance of the motor.

In addition, the EWB can implement various additional functions, such as a function for maintaining a set clearance of a pad, a Fail-Safe function for suppressing a brake failure to prevent a vehicle from being abnormally rotated during normal driving, and an EPB (Electric Parking Brake) function.

The present applicant has filed several applications about the above-mentioned EWB to the Korean Intellectual Property Office. For example, the following brake system has been disclosed in Korean Patent Application No. 10-2007-0065114. The brake system implements a main braking function with power generated by one motor. Further, the brake system implements various additional functions, such as a function for maintaining a set clearance of a pad, a Fail-Safe function, and an EPB (electronic parking brake) function, by using a NSL (Non-Self Locking) screw and a solenoid mechanism interlocked with a main braking motor.

However, if one motor and a solenoid are used as described above, the solenoid should support an axial reaction force transmitted from a pad against a disk pressing force. That is, when a main braking or an additional function is performed, the solenoid is controlled so as to correspond to various regions to which an axial reaction force is applied. For this reason, a high-performance solenoid, which can sufficiently support various axial reaction forces, should be used, which causes manufacturing cost to increase.

Further, if a low-performance solenoid is used to reduce manufacturing cost, the structure is modified so as to disperse an axial reaction force by using additional members for supporting an axial reaction force transmitted from a pad, for example, an NSL (Non-Self Locking) screw to which an axial reaction force is applied and a housing in which a solenoid for fixing the NSL screw is received. In this way, it is possible to reduce a load charged by the solenoid. However, there are problems in that the design of the brake system is changed and the size of the brake system is increased.

SUMMARY OF THE INVENTION

Embodiments of the present invention provide a solenoid assisting force generated type single motor electronic wedge brake system. The electronic wedge brake system (EWB) uses power generated by one motor to implement a main braking function by performing self-energizing, which is caused by a wedge operation. The electronic wedge brake system includes a solenoid mechanism that implements various additional functions, such as a function for maintaining a set clearance of a pad, a Fail-Safe function, and an EPB (Electric Parking Brake) function. An axial reaction force transmitted to the solenoid is reduced using a frictional force of a NSL (Non-Self Locking) screw that supports an axial reaction force, which is applied to the pad from a wheel disk during the operation. Therefore, a load control region of the solenoid is decreased, and it is possible to sufficiently support an axial reaction force even if a low-performance solenoid may be used in the electronic wedge brake system.

Further, embodiments of the present invention provide an electronic wedge brake (EWB) system, which uses power generated by one motor. In the electronic wedge brake (EWB), a frictional force is applied to a NSL (Non-Self Locking) screw for dispersing an axial reaction force, which is applied to a pad from a wheel disk, so that a load applied to a solenoid interlocked with the motor is reduced. Therefore, even though a low-performance solenoid may be used in the electronic wedge brake, the entire structure of the electronic wedge brake does not need to be changed.

Furthermore, embodiments of the present invention provide an electronic wedge brake system, which uses power generated by one motor and reduces a load of a solenoid mechanism interlocked with the motor by using a NSL (Non-Self Locking) screw. Accordingly, an axial load charged by the solenoid is reduced. For this reason, it is possible to more simply implement control logic by simplifying the control of the solenoid.

According to an embodiment of the present invention, a solenoid assisting force generated type single motor electronic wedge brake system includes a wedge structure, a NSL (Non-Self Locking) type push rod shaft, and a solenoid. When a pad is pressed against a wheel disk by using power generated from one motor driven by an electronic pedal used to brake a vehicle and an ECU receiving vehicle information signals, the wedge structure performs self-energizing by using a wedge roller. The NSL (Non-Self Locking) type push rod shaft supports an axial reaction force transmitted from the pad during operation. The solenoid is controlled by an ECU so as to constrain or release the push rod shaft. The wedge structure for performing self-energizing includes a wedge roller, a solenoid, a friction generating assembly, and an EPB spring. The wedge roller implements a wedge operation between a wedge moving plate and a wedge base plate, by using an axial linear motion converted from torque of the motor controlled by the ECU. The wedge moving plate moves an inner pad of a wedge caliper provided to the wheel disk.

The wedge base plate is provided on a side opposite to the wedge moving plate. The solenoid includes a push rod shaft and a switching lever. The push rod shaft is positioned at the base plate and has NSL type threads screwed to a supporting nut having NSL type threads together with a spring in order to support an axial reaction force transmitted from the pad. The switching lever is engaged with or separated from a latch of the push rod shaft in order to constrain or release an axial movement of the push rod shaft as the solenoid is controlled by the ECU. The friction generating assembly is provided at the end of the push rod shaft, and moves together with the push rod shaft moving in an axial direction so that an axial reaction force transmitted from the pad is dispersed by the push rod shaft. Further, when the axial reaction force transmitted from the pad to the wedge base plate is applied to the friction generating assembly, the friction generating assembly generates a frictional force for supporting an axial reaction force by using the push rod shaft. The EPB spring presses and constrains the push rod shaft of the adjusting unit to maintain a performance of a park braking during the operation of an electric parking brake.

In the above-mentioned electronic wedge brake system, the friction generating assembly may further include a movable frictional part, a stationary frictional part, and an elastic contact part. The movable frictional part protrudes from a rear surface of the latch formed on the push rod shaft, so as to form a hollow shape. The stationary frictional part protrudes from a wedge braking unit and comes in contact with the movable frictional part so as to generate a frictional force. When the push rod shaft supports an axial reaction force, the elastic contact part comes in contact with the stationary frictional part, is pressed against the stationary frictional part, and is deformed elastically.

In the above-mentioned electronic wedge brake system, a central portion of the elastic contact part may be bent to protrude from both ends thereof.

According to an embodiment of the present invention, an electronic wedge brake (EWB), which performs a self-energizing wedge operation, uses power generated form one motor. Further, and a solenoid mechanism is interlocked with a motor. Further, a NSL (Non-Self Locking) screw for generating a frictional force is used to reduce a load of the solenoid that supports an axial reaction force. Accordingly, it is possible to simply control the solenoid of which a load used to support an axial load is reduced, and to use a low-performance solenoid as the solenoid.

In addition, a frictional force of a NSL (Non-Self Locking) screw is used as an axial reaction force charged by a solenoid that is interlocked with one motor. Therefore, even though a low-performance solenoid may be used in an electronic wedge brake (EWB) according to an embodiment of the present invention, the entire structure of the electronic wedge brake does not need to be changed.

BRIEF DESCRIPTION OF THE DRAWINGS

For a better understanding of the nature and objects of the present invention, reference should be made to the following detailed description with the accompanying drawings, in which:

FIGS. 2A, 2B and 2C are views showing that an axial reaction force supporting NSL (Non-Self Locking) screw and a solenoid according to the embodiment of the present invention are combined with each other;

FIG. 3A is a cross-sectional view of the axial reaction force supporting NSL (Non-Self Locking) screw according to the embodiment of the present invention;

FIG. 3B is a view showing a relationship between forces in the axial reaction force supporting NSL screw;

FIGS. 5A to 5G are views illustrating the wedge operation of the single motor electronic wedge brake system according to the embodiment of the present invention during main braking;

FIGS. 9A to 9C are views illustrating the operation of the axial reaction force supporting NSL (Non-Self Locking) screw according to the embodiment of the present invention while the set clearance of the pad according to the embodiment of the present invention is maintained.

DETAILED DESCRIPTION OF THE PREFERRED EMBODIMENTS

A preferred embodiment of the present invention will be described in detail below with reference to the accompanying drawings. Since the embodiment may be modified in various ways by those skilled in the art, the present invention is not limited to the embodiment.

Figure 1:
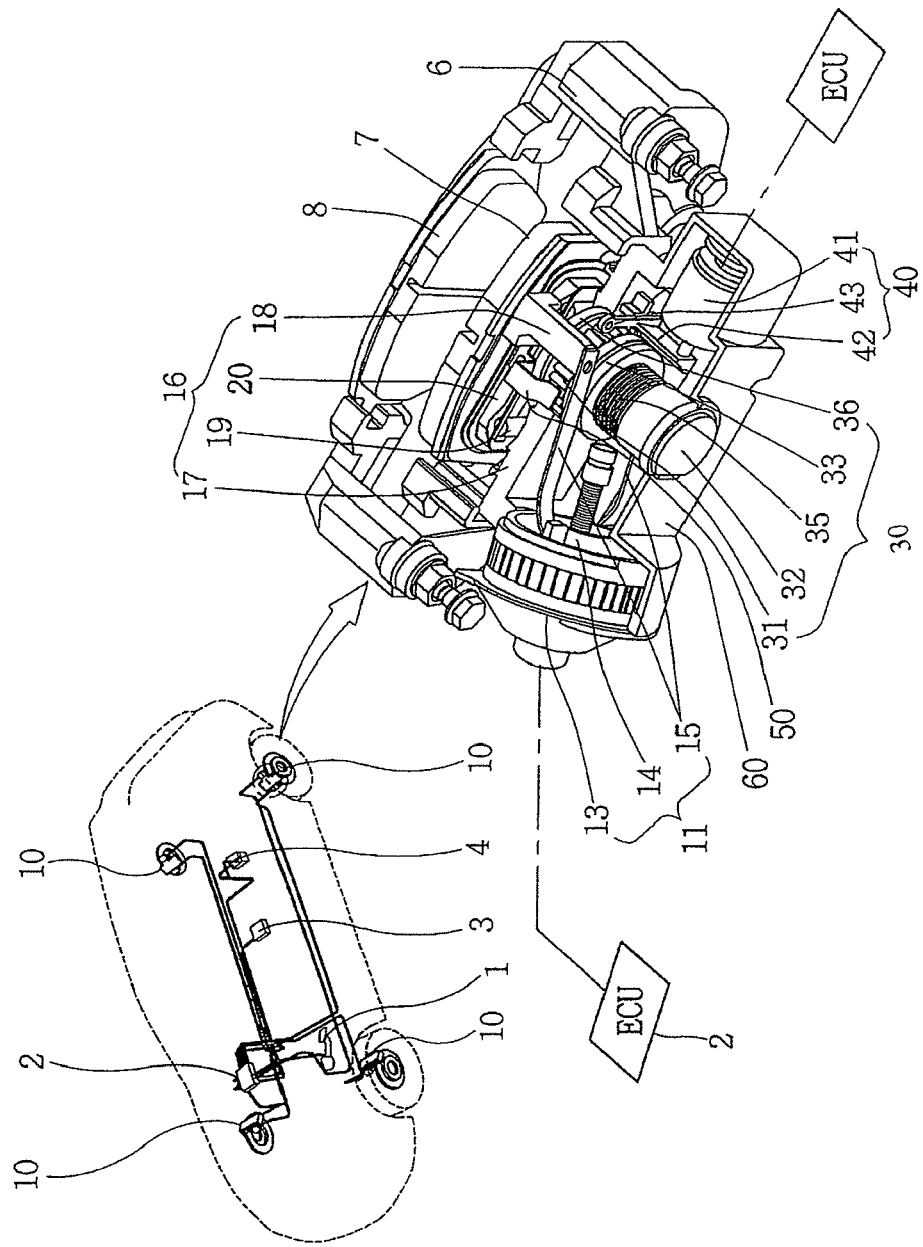
FIG. 1 is a view showing the configuration of a solenoid assisting force generated type single motor electronic wedge brake system according to an embodiment of the present invention.

FIG. 1 is a view of a solenoid assisting force generated type single motor electronic wedge brake system according to an embodiment of the present invention. In a single motor electronic wedge brake system according to an embodiment of the present invention, when a driver operates an electronic pedal 1 in order to brake a vehicle, an ECU 2 generates control signals in consideration of vehicle information. Accordingly, wedge actuator assemblies 10, which are provided on wedge calipers 6 surrounding wheel disks 5, implement a braking function and various additional functions by using power generated from one motor 13 driven by ECU 2.

That is, each of wedge actuator assemblies 10 includes one motor 13 and a wedge structure in order to implement a main braking function for pressing pads against a wheel disk 5. Motor 13 is driven by ECU 2, and the wedge structure is moved by motor 13 to perform self-energizing. Each of the wedge actuator assemblies further includes a solenoid 41 and a NSL (Non-Self Locking) screw type device, which are interlocked with each other when a function for maintaining a set clearance of a pad, a Fail-Safe function, and an EPB (Electric Parking Brake) function.

The single motor electronic wedge brake system further includes an auxiliary battery 4 that is used as a spare battery for ECU 2, motors 13 of actuator assemblies 10, and solenoids 41.

Further, when the EPB (Electric Parking Brake) is operated, the single motor electronic wedge brake system receives signals so that ECU 2 perceives a parking brake conversion state. This is performed using a parking brake button, which generates separate electric signals corresponding to portions of a driver's seat and supplies the signals to ECU 2.

The single motor electronic wedge brake system further includes housings 60 in which wedge actuator assemblies 10 are received, respectively. Each of housings 60 is fixed to wedge caliper 6.

In this case, wedge caliper 6 and housing 60 may be fixed to each other in various ways. For example, housing 60 may have a guide that protrudes and is inserted into wedge caliper 6. Accordingly, the housing is fixed to the wedge caliper.

ECU 2 performs the control required for braking on the basis of information about a pushing distance of electronic pedal 1 to be operated and information about an attitude of a vehicle obtained from a yaw moment sensor 3 provided in the vehicle.

In addition, various sensors are provided to wedge caliper 6 and wedge actuator assembly 10 fixed to the wedge caliper, so that measurement signals are transmitted to ECU 2. For example, pad abrasion sensing sensors, which sense an increase of a clearance between wheel disks 5 depending on the increase of a set clearance of the pad so as to always maintain a set clearance, and load sensors, which are used to prevent wheel jamming from occurring when a pad is pressed against wheel disk 5 by a wedge roller during the braking, may be provided to the wedge caliper and the wedge actuator assembly.

Further, wedge caliper 6 includes inner and outer pads 7 and 8 that cover wheel disk 5 rotating together with the wheel and are provided on both sides of wheel disk 5 to press wheel disk 5.

Wedge caliper 6 includes a torque member for performing an interlocking operation (the operation of a general caliper type brake) so that outer pad 8 provided on the opposite side to the inner pad is also moved toward wheel disk 5 when inner pad 7 is pressed against wheel disk 5.

Further, each of wedge actuator assemblies 10 includes a braking motor unit 11 and a wedge braking unit 16. Braking motor unit 11 generates a braking force with power, which is generated by one motor 13 controlled by ECU 2. Wedge braking unit 16 is interlocked with braking motor unit 11 so as to press inner and outer pads 7 and 8 against wheel disk 5 at one side of wedge caliper 6.

In addition, each of wedge actuator assemblies 10 includes a solenoid mechanism. The solenoid mechanism is interlocked with the NSL (Non-Self Locking) screw type device so as to implement a function for maintaining set clearances of inner and outer pads 7 and 8, a Fail-Safe function against motor troubles, and an EPB (Electric Parking Brake) function.

Braking motor unit 11 generates power, which is used to implement the brake function, by the control of ECU 2 during the braking. Braking motor unit 11 operates wedge braking unit 16, which presses inner pad 7 provided on one side of wheel disk 5, by using one motor 13 provided on one side of housing 60, which is fixed to the side of wedge caliper 6, as a power source.

For this purpose, as shown in FIG. 2A, braking motor unit 11 includes motor 13, a linear motion converter 14, and an interlocking rod 15. Motor 13 is provided in one side of housing 60 fixed to the side of wedge caliper 6, and is controlled by ECU 2. Linear motion converter 14 is fixed to an output shaft of motor 13, and moves forward and backward in an axial direction depending on the drive of the motor. Interlocking rod 15 is fixed to linear motion converter 14, and moves depending on the axial movement of linear motion converter 14.

In this case, when a rotating shaft of linear motion converter 14 is rotated by the drive of motor 13, the linear motion converter moves forward and backward according to the rotational direction of the rotating shaft due to the fact that the linear motion converter is engaged with treads formed on the outer periphery of the rotating shaft. This structure is generally applied to an EWB (electronic wedge brake) of a vehicle.

For example, although an interlocking rod 15 of a linear motion converter 14 has a little different shape, the interlocking rod moves forward and backward in an axial direction of a motor 13 by the drive of the motor. Further, a method of generating a shaft pulling force in an electric parking brake (EPB) is a method using still another structure.

Further, interlocking rod 15 diagonally crosses housing 60 and is positioned on the side opposite to motor 13. Interlocking rod 15 moves together with linear motion converter 14, which moves in the axial direction depending on the drive of motor 13.

The reason for the diagonal arrangement of interlocking rod 15 is to utilize a space in housing 60, and housing 60 is made more compact by reducing the space in housing 60, which is occupied by interlocking rod 15.

In this case, interlocking rod 15 is composed of a pair of upper and lower pieces, which is provided at lower and upper portions of linear motion converter 14, so that a moving force caused by linear motion converter 14 becomes uniform.

Further, wedge braking unit 16 performs self-energizing by using the wedge structure so as to increase a force for pulling the pads. The wedge braking unit is fixed at one side of wedge roller 19, and is movable by an axial moving force generated by motor 13 at the other side of the wedge roller.

For this purpose, wedge braking unit 16 includes a wedge moving plate 17, a wedge base plate 20, and a wedge roller 19. Wedge moving plate 17 is moved by a connecting rod 18 to which an axial moving force generated by motor 13 is applied. Wedge base plate 20 is arranged parallel and opposite to wedge moving plate 17 so as to face wedge moving plate 17. Wedge roller 19 is provided between rolling contact surfaces 17a and 20a that are formed between a pair of plates 17 and 20, and generates a frictional force.

In this case, wedge moving plate 17 is combined with inner pad 7 so as to press inner pad 7, which is positioned on a side of wheel disk 5 opposite to outer pad 8, against wheel disk 5.

Wedge base plate 20 is stationary with respect to wedge moving plate 17, which is moved by power of motor 13. For this purpose, wedge base plate 20 is formed using a part of housing 60 fixed to the side of wedge caliper 6.

Connecting rod 18 is fixed to an end of interlocking rod 15, which is moved in an axial direction by linear motion converter 14 moved depending on the drive of motor 13, and moves wedge plate 17 in a direction where interlocking rod 15 is moved.

Further, connecting rod 18 extends perpendicular to the surface of the wedge moving plate at upper and lower portions of wedge moving plate 17, and is fixed to the end of interlocking rod 15 by bolts or the like.

Wedge roller 19 is provided between the pair of plates 17 and 20 facing each other, and has a cylindrical shape. The wedge roller causes a wedge phenomenon where self-energizing is performed by a frictional force generated depending on the behavior of plates 17 and 20, and then applies an input force to press the pad.

For this purpose, wedge roller 19 is positioned between rolling contact surfaces 17a and 20a including a plurality of grooves, which has V-shaped cross sections and is formed on the surfaces of the pair of plates 17 and 20 facing each other. Rolling contact surfaces 17a and 20a including the plurality of grooves, which has V-shaped cross sections, and wedge roller 19 generate a frictional force. Further, rolling contact surfaces 17a and 20a make one plate (wedge plate 17) move toward the pad depending on the change in position of wedge roller 19.

The solenoid mechanism, which implements various additional functions in addition to a main braking function implemented using braking motor unit 11 and wedge braking unit 16 during the operation of the EWB, includes solenoid 41 and a NSL (Non-Self Locking) type screw so as to implement a pad compensating function, a Fail-Safe function, and an electric parking brake function. Solenoid 41 is controlled by ECU 2, and the NSL (Non-Self Locking) type screw supports an axial reaction force transmitted from wheel disk 5 to the pad. The solenoid mechanism operates using an interaction between the solenoid and the NSL type screw. For example, the NSL type screw may be provided by the push rod shaft having NSL type threads which are screwed to a supporting nut having NSL type threads.

For this purpose, as shown in FIGS. 2B and 2C, the solenoid mechanism includes an adjusting unit 30, a solenoid unit 40, and an EPB spring 50. Adjusting unit 30 includes the NSL (Non-Self Locking) type screw that supports the axial reaction force transmitted from wheel disk 5 to the pad when the pad compensating function, the Fail-Safe function, and the electric parking brake function are implemented. Solenoid unit 40 is turned on or off to operate adjusting unit 30, and releases or applies a constraining force. EPB spring 50 constrains adjusting unit 30 to maintain a park braking performance during the operation of the electric parking brake.

In addition, adjusting unit 30 includes a friction generating assembly 36. The friction generating assembly disperses the axial reaction force transmitted from wheel disk 5 to the pad during the operation thereof. Meanwhile, friction generating assembly 36 disperses a load applied to solenoid 41 that constrains adjusting unit 30, thereby reducing a load of solenoid 41.

That is, friction generating assembly 36 supports the axial reaction force, which is transmitted to the pad, by using a frictional force. Therefore, solenoid 41 can support only a force applied by spring 35 that pushes push rod shaft 31 of adjusting unit 30. Since the load of solenoid 41 is reduced, a low-performance solenoid 41 may be used under the same conditions.

As shown in FIG. 3A, adjusting unit 30 includes a supporting nut 32, a push rod shaft 31, a spring 35, and a friction generating assembly 36. Supporting nut 32 is fixed to housing 60 and has NSL type threads. Push rod shaft 31 is screwed to supporting nut 32 through a push rod screw 31b that has NSL type threads on the outer periphery thereof, and moves in the axial direction while being rotated. The push rod shaft includes a latch 31a so that the constraint of the push rod shaft is released by solenoid 41. One end of spring 35 is fixed to supporting nut 32, and the other end of the spring continuously applies an axial force to a front bearing 33. Friction generating assembly 36 is provided at the end of push rod shaft 31.

In this case, push rod shaft 31 and supporting nut 32 use a NSL (Non-Self Locking) type screw, that is, a screw having a large lead angle. Accordingly, when a force is applied to the push rod shaft in an axial direction, the push rod shaft is automatically rotated and moved in the axial direction due to the large lead angle.

When being in initial assembling, spring 35 is provided between supporting nut 32 and front bearing 33 so as to continuously apply a force to front bearing 33.

In addition, push rod shaft 31 is provided with a pair of front and rear bearings 33 and 34. Front bearing 33 is positioned at the front side of latch 31a, which is formed on the outer periphery of a portion of the push rod shaft, on which push rod screw 31b is not formed. Rear bearing 34 is positioned at the rear side of latch 31a and in an inner space of friction generating assembly 36.

In this case, thrust bearings are used as front and rear bearings 33 and 34. Since friction generating assembly 36 provided on push rod shaft 31 constrains push rod shaft 31 to which an axial force is applied by spring 35, small forces are applied to front and rear bearings 33 and 34. For this reason, low-performance thrust bearings may be used.

Adjusting unit 30 is disposed at the central portion of base plate 20 of wedge braking unit 16 so that a force applied by push rod shaft 31 is applied to wedge base plate 20.

In addition, friction generating assembly 36 of adjusting unit 30 includes a movable frictional part 37, a stationary frictional part 38, and an elastic contact part 39. Movable frictional part 37 protrudes from the rear surface of latch 31a formed on push rod shaft 31, so as to form a hollow shape. Stationary frictional part 38, which receives movable frictional part 37 therein and generates a frictional force, protrudes from wedge braking unit 16. When push rod shaft 31 supports an axial reaction force, elastic contact part 39 comes in contact with stationary frictional part 38, is pressed against the stationary frictional part, and is deformed elastically.

Further, stationary frictional part 38 is formed using wedge base plate 20 of wedge braking unit 16, and has a recess into which movable frictional part 37 is inserted.

The contact surfaces of movable frictional part 37 and stationary frictional part 38 have various shapes so that a frictional force is significantly increased when movable frictional part 37 and stationary frictional part 38 come in contact with each other. For example, the contact surfaces of movable frictional part 37 and stationary frictional part 38 are formed of inclined frictional contact surfaces 37a and 38a so that the maximum amount of contact area between frictional contact surfaces 37a and 38a occurs.

In this case, frictional contact surface 37a is formed of the outer periphery of movable frictional part 37, and frictional contact surface 38a is formed of the inner periphery of stationary frictional part 38.

FIG. 3B shows the relationship between frictional forces generated from friction generating assembly 36. That is, when the constraining force of solenoid 41 is released and push rod shaft 31 is pushed by an axial force Fn applied by spring 35 of the NSL screw, movable frictional part 37 provided at the end of push rod shaft 31 moves toward stationary frictional part 38, so that movable frictional part 37 and stationary frictional part 38 come in contact with each other by frictional contact surfaces 37a and 38a.

When movable frictional part 37 and stationary frictional part 38 come in contact with each other, a normal force (reaction force) Fr perpendicular to the surface of the movable frictional part is generated and constraining torque Tf for preventing push rod shaft 31 from rotating is generated. Constraining torque Tf reduces additional torque $\Delta T$ to be transmitted to push rod shaft 31.

The relationship between the forces is represented by the following equation.

$$Fr = \Delta Fn / \sin a \quad (1)$$

$$Tf = \mu (\Delta Fn / \sin a) Rf \quad (2)$$

$$\Delta T = \Delta Fn (\tan \alpha - \tan \beta) Rf \quad (3)$$

where, a indicates an angle where a frictional surface is generated, Rf indicates an effective radius of the friction surface, ΔFn indicates an axial force to be additionally applied after a spring applies a force, Fr indicates a normal force (reaction force) to be applied to the friction surface, Tf indicates torque to be applied in a direction where rotation is prevented by a frictional force, ΔT indicates torque causing the rotation by an additional force, and μ indicates a friction coefficient of the friction surface.

Further, elastic contact part 39 is received in movable frictional part 37 having a recess that surrounds rear bearing 34 provided at the end of push rod shaft 31, and the central portion of the elastic contact part protrudes from the end of push rod shaft 31.

For this purpose, as shown in FIG. 2C, both ends of elastic contact part 39 are fixed to rear bearing 34, and the central portion of the elastic contact part is bent to protrude from both ends thereof. The protruding central portion protrudes from the end of movable frictional part 37.

Elastic contact part 39 protrudes so that elastic contact part 39 comes in contact with stationary frictional part 38 before movable frictional part 37 comes in contact with stationary frictional part 38, during the movement of push rod shaft 31.

In addition, the elastic modulus of elastic contact part 39 is larger than that of spring 35, which is provided on push rod shaft 31 and pushes push rod shaft 31 in the axial direction. The reason for this is to allow elastic contact part 39 to constrain the movement of push rod shaft 31 even though push rod shaft 31 is pushed by the axial force applied by spring 35.

Figure 4B:
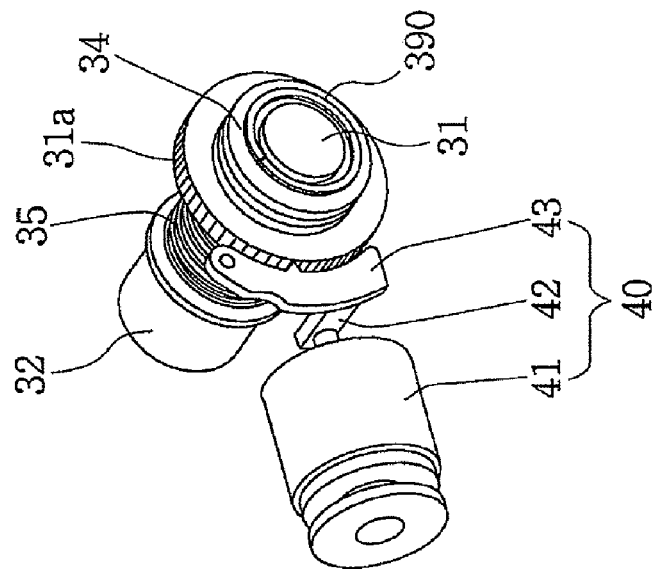
FIGS. 4A and 4B are views showing the modification of the axial reaction force supporting NSL (Non-Self Locking) screw according to the embodiment of the present invention.
Figure 4A:
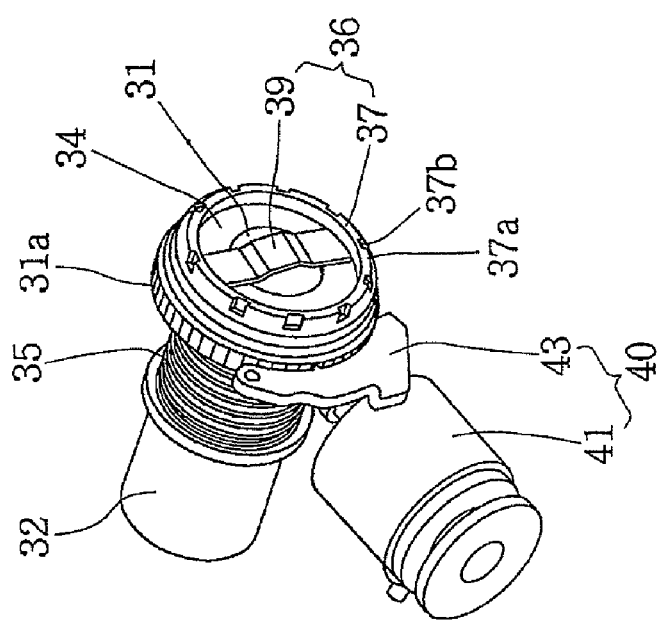

Meanwhile, friction generating assembly 36 may be modified in various ways. For example, the friction generating assembly may be modified so that heat caused by friction is reduced. That is, as shown in FIG. 4A, grooves 37b are formed on frictional contact surface 37a, which is formed of the outer periphery of movable frictional part 37, at regular intervals. Accordingly, the contact area between frictional contact surface 37a and frictional contact surface 38a of stationary frictional part 38 is reduced and spaces formed of grooves 37b are formed between the contact surfaces, so that it is possible to reduce heat caused by friction.

Further, the elastic contact part, which generates an elastic force during the deformation, may be modified. That is, as shown in FIG. 4B, the elastic contact part may be modified into an elastic contact part 390. In elastic contact part 390, the end of a push rod shaft 31 on which a rear bearing 34 is provided protrudes slightly and a push washer type spring is fixed to the protruding end of push rod shaft 31.

In this case, elastic contact part 390 slightly protrudes from the end of push rod shaft 31. Accordingly, during the axial movement of push rod shaft 31, before movable frictional part 37 comes in contact with stationary frictional part 38, elastic contact part 390 comes in contact with stationary frictional part 38 and is elastically deformed.

Further, as shown in FIGS. 2A to 2C, solenoid unit 40 includes a solenoid 41 that is received at one side in housing 60 and turned on or off by ECU 2, and a switching lever 43 that moves by a movable shaft protruding or retreating during the operation of solenoid 41.

In this case, when the movable shaft of solenoid 41 extends, switching lever 43 is engaged with latch 31a of push rod shaft 31 and constrains push rod shaft 31. When the movable shaft of solenoid 41 is retreated, the switching lever is separated from latch 31a of push rod shaft 31 and releases the constraint of push rod shaft 31. For this purpose, switching lever 43 has the shape of teeth engaged with latch 31a.

In addition, a connecting lever 42 is further provided between solenoid 41 and switching lever 43, and connecting lever 42 is fixed to the switching lever so that switching lever 43 is moved in a direction where the movable shaft of solenoid 41 is moved.

In this case, when the pressing performed by solenoid 41 is released, switching lever 43 is separated from push rod shaft 31 by connecting lever 42. However, the switching lever is supported by a spring so that an elastic restoring force is applied to the switching lever.

Accordingly, in adjusting unit 30, push rod shaft 31 is disposed in the axial direction with respect to the pad, and solenoid 41 is disposed at the side of push rod shaft 31 so as to be orthogonal to the push rod shaft. Further, switching lever 43, which constrains or releases push rod shaft 31 depending on the arrangement of push rod shaft 31 and solenoid 41, is assembled so as to be engaged with latch 31a of push rod shaft 31. As a result, as long as solenoid 41 is not turned off, the axial movement of push rod shaft 31 is constrained.

Meanwhile, one end of EPB spring 50, which is used to implement an electric parking brake function, is fixed to wedge braking unit 16. The other end of the EPB spring is positioned at latch 31a of push rod shaft 31 of adjusting unit 30. Accordingly, when solenoid 41 is turned off during the operation of the parking brake, one end of EPB spring 50 constrains push rod shaft 31. As a result, when solenoid 41 is turned off, the EPB spring constrains adjusting unit 30.

Figure 10A:
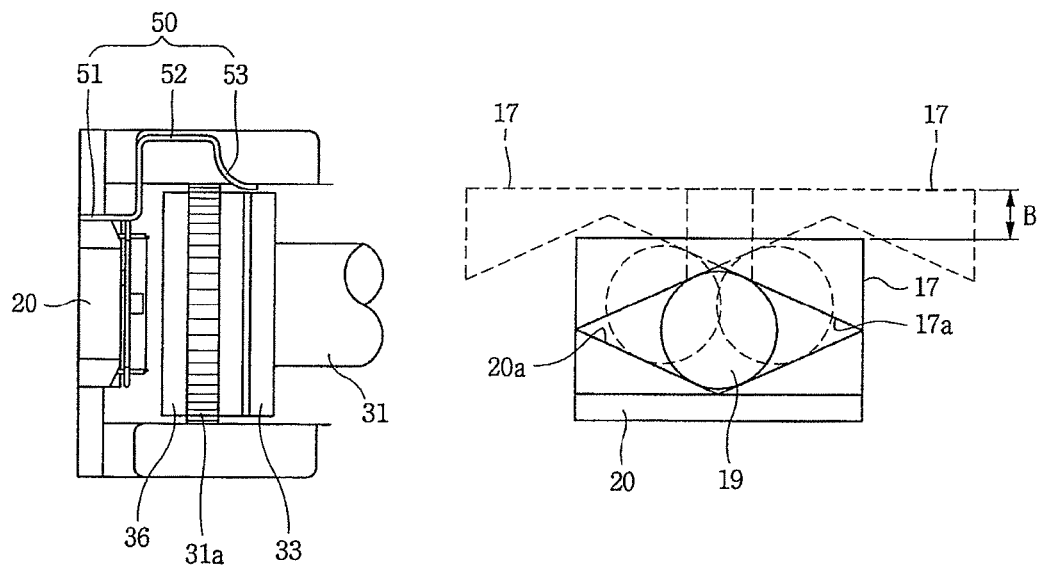
FIGS. 10A and 10B are views illustrating the operation of the Electric Parking Brake according to the embodiment of the present invention.

For this purpose, as shown in FIG. 10A, EPB spring 50 includes a fixation portion 51 that is screwed to wedge braking unit 16, a connection portion 52 that is bent and extends so as to protrude from fixation portion 51, and a press portion 53 that is bent downward from the end of connection portion 52 and constrains the axial movement of push rod shaft 31 when solenoid 41 is turned off.

The constraint of push rod shaft 31, which is performed by EPB spring 50, is implemented at various portions. For example, press portion 53 of EPB spring 50 catches the side surface of latch 31a of push rod shaft 31 so as to constrain the movement of push rod shaft 31. A constraining force is obtained from a strong elastic force.

Further, in order to improve the constraining force of push rod shaft 31, EPB spring 50 may be composed of a pair of pieces constraining push rod shaft 31 at upper and lower portions of the push rod shaft.

The operation of the single motor electronic wedge brake system according to the embodiment of the present invention will be described in detail below with reference to the accompanying drawings.

While driving one motor 13, the electronic wedge brake (EWB) system according to the embodiment of the present invention implements a main braking function by self-energizing caused by a wedge operation. Since only one motor is used, it is possible to reduce the number of parts and to simplify the structure. Further, the electronic wedge brake system implements various functions, such as a function for maintaining a set clearance of a pad, a Fail-Safe function, and an EPB function by using solenoid 41 interlocked with the NSL (Non-Self Locking) type screw that moves in the axial direction. When the electronic wedge brake system is operated, an axial reaction force transmitted from the pad is dispersed using a frictional force caused by NSL (Non-Self Locking) type push rod shaft 31. Accordingly, a load of solenoid 41, which constrains push rod shaft 31, is reduced. As a result, a low-performance solenoid 41 may be used.

The electronic wedge brake system uses one motor 13 and implements a function for maintaining a set clearance of a pad, a Fail-Safe function, and an EPB function except for the main braking by using a solenoid mechanism interlocked with a NSL (Non-Self Locking) type screw. Further, since the electronic wedge brake system converts a frictional force, which is generated by friction generating assembly 36 provided on NSL (Non-Self Locking) type push rod shaft 31 into a supporting force, an axial reaction force transmitted from the pad is dispersed and transmitted to push rod shaft 31 and solenoid 41. For this reason, it is possible to obtain these various characteristics of the present invention.

Accordingly, in the EWB according to the embodiment of the present invention, as shown in FIG. 1, a wedge caliper 6 including inner and outer pads 7 and 8 is provided at wheel disk 5 that is rotated together with a wheel. Further, a wedge actuator assembly 10, which is controlled by ECU 2 receiving operational information of electronic pedal 1, is provided in housing 60, and is fixed to the side of wedge caliper 6.

Wedge actuator assembly 10 includes one motor 13 controlled by ECU 2, and wedge braking unit 16. Wedge braking unit 16 has a wedge structure that generates an input force pressing the pad due to self-energizing while moving the pad as the torque of the motor is converted into an axial moving force by linear motion converter 14. In this case, the self-energizing is caused by the change in position of the wedge roller depending on the behavior of wedge roller 19 with respect to the pad.

Wedge actuator assembly 10 further includes adjusting unit 30. Adjusting unit 30 performs an adjustment function for maintaining a clearance between wheel disk 5 and the pad when the pad is abraded. Further, adjusting unit 30 includes a NSL (Non-Self Locking) type screw, which is interlocked with solenoid 41 by switching lever 43, so as to implement the Fail-Safe function for releasing the pressing of wedge braking unit 16 when motor 13 malfunctions in a braking state.

Further, adjusting unit 30 includes an EPB spring 50. When solenoid 41 is turned off during the braking, EPB spring 50 constrains the movement of push rod shaft 31, to which an axial reaction force transmitted from the pad is applied, of push rod shaft 31 together with solenoid 41.

In addition, adjusting unit 30 includes a friction generating assembly 36 that disperses an axial reaction force transmitted from wheel disk 5 to the pad during the operation thereof. Since generating a frictional force between push rod shaft 31 and wedge base plate 20 and supporting the axial reaction force, friction generating assembly 36 disperses a load applied to solenoid 41 that constrains push rod shaft 31.

Friction generating assembly 36 includes a movable frictional part 37 and a stationary frictional part 38. Movable frictional part 37 protrudes from the rear surface of latch 31a formed on push rod shaft 31, so as to form a hollow shape. Stationary frictional part 38, which receives movable frictional part 37 therein and generates a frictional force, protrudes from wedge braking unit 16. When push rod shaft 31 supports an axial reaction force, a frictional force is generated by frictional contact surface 37a of movable frictional part 37 and frictional contact surface 38a of stationary frictional part 38.

In addition, friction generating assembly 36 further includes an elastic contact part 39 provided at the end of push rod shaft 31. When push rod shaft 31 supports the axial reaction force, the elastic contact part comes in contact with stationary frictional part 38, is pressed against the stationary frictional part, and is deformed elastically.

The operation, which is performed by the EWB according to the embodiment of the present invention using one motor 13, will be classified into the main braking function and the various additional functions, such as a function for maintaining a set clearance of a pad, a Fail-Safe function, and an EPB function, and will be described in detail below.

As shown in FIG. 1, In the main braking function of the present invention, when ECU 2 generates control signals by analyzing information about a pushing distance of electronic pedal 1 and information about a running vehicle obtained from various sensors, motor 13 controlled by ECU 2 is driven and linear motion converter 14 generates an axial moving force in the axial direction, that is, in a direction where the linear motion converter protrudes from motor 13 (braking against forward movement) or retreats toward motor 13 (braking against backward movement) depending on the rotational direction of motor 13.

Subsequently, the axial moving force of linear motion converter 14 caused by motor 13 moves interlocking rod 15 fixed to linear motion converter 14, and the movement of interlocking rod 15 causes wedge braking unit 16 fixed to the end thereof to be continuously and linearly moved together with the pad. As wedge braking unit 16 is moved, a force for pressing the pad against wheel disk 5 is generated due to the wedge structure using wedge roller 19.

That is, wedge moving plate 17 connected to connecting rod 18 and inner pad 7 fixed to the side of the wheel disk are moved by an axial moving force, which is converted by motor 13, with respect to wedge base plate 20 integrally formed with housing 60.

For this reason, wedge roller 19, which is positioned at the central portion between rolling contact surfaces 17a and 20a of the moved wedge moving plate 17 and the fixed wedge base plate 20, generates a frictional force due to the movement of wedge moving plate 17.

That is, as wedge moving plate 17 is moved forward, wedge roller 19 is moved from the central portion between rolling contact surfaces 17a and 20a to the outside as shown in FIGS. 5A to 5C. The movement of wedge roller 19 with respect to rolling contact surfaces 17a and 20a causes wedge moving plate 17 to be further separated from wedge base plate 20.

Accordingly, wedge moving plate 17 is linearly moved and causes a clearance due to the change in position of wedge roller 19. The clearance between wedge moving plate 17 and wedge base plate 20 causes a wedge effect of wedge roller 19 where inner pad 7 generates an input force pressing wheel disk 5.

Subsequently, when braking is released, ECU 2 drives motor 13 in a reverse direction and allows wedge moving plate 17 to return to the initial position by linear motion converter 14, interlocking rod 15, and connecting rod 18 as shown in FIGS. 5D and 5E. Accordingly, wedge roller 19 also returns to the central position between rolling contact surfaces 17a and 20a. Therefore, a force pressing wedge moving plate 17 against wheel disk 5 is released and a braking force is also released.

Further, even when a vehicle running backward is braked, a vehicle is braked in the same manner as when a vehicle running forward is braked. That is, ECU 2, which receives a signal of electronic pedal 1 and perceives the backward running of a vehicle, drives motor 13 in a reverse direction (forward running is referred to as driving in a normal direction).

Then, if linear motion converter 14, interlocking rod 15, and connecting rod 18 are pulled toward motor 13 by the reverse drive of motor 13, wedge moving plate 17 pulls inner pad 7 in the same direction.

The pulling movement of wedge moving plate 17 causes wedge roller 19, which is positioned at the central portion between rolling contact surfaces 17a and 20a of the moved wedge moving plate 17 and the fixed wedge base plate 20, to move as shown in FIGS. 5F and 5G by a frictional force due to the movement of wedge moving plate 17.

That is, since wedge roller 19 is moved to the outside of rolling contact surfaces 17a and 20a, wedge moving plate 17 is further separated from wedge base plate 20. The clearance between wedge moving plate 17 and the wedge base plate causes an input force of inner pad 7, which presses wheel disk 5. Therefore, a braking force is generated.

Subsequently, when the braking is released, ECU 2 drives motor 13 in a normal direction and allows wedge roller 19 to return to the central position between rolling contact surfaces 17a and 20a as shown in FIG. 5E, thereby releasing the braking force.

During the main braking, a friction generating assembly 36 provided on push rod shaft 31 disperses an axial reaction force applied from the pads, which press wheel disk 5. Accordingly, the friction generating assembly reduces a load of solenoid 41 that constrains push rod shaft 31.

Figure 6A:
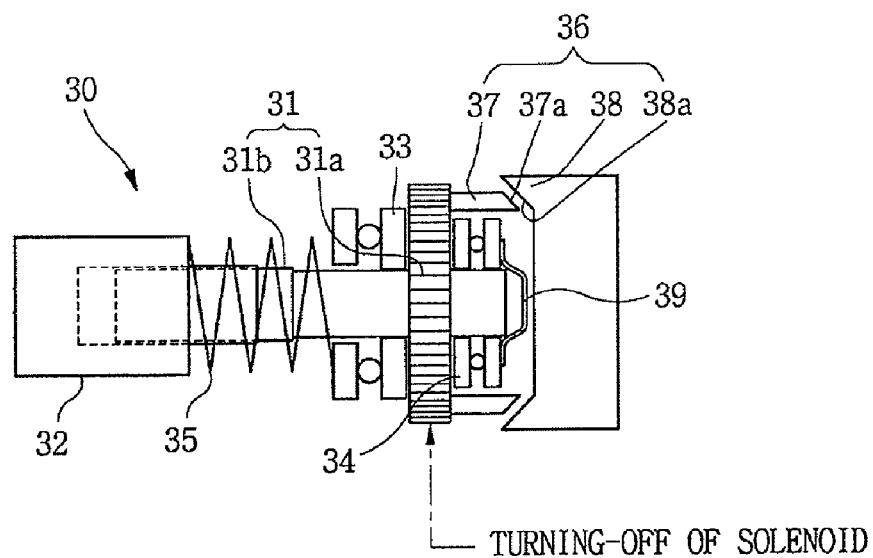
FIGS. 6A and 6B are views illustrating the operation of the axial reaction force supporting NSL (Non-Self Locking) screw according to the embodiment of the present invention during main braking.

That is, during the main braking, ECU 2 turns off solenoid 41 to separate switching lever 43 from latch 31a formed on push rod shaft 31. Accordingly, as shown in FIG. 6A, the NSL screw type push rod shaft 31 is loosened from supporting nut 32 by a force applied by a spring 35, and moves in an axial direction.

While the braking function is implemented, push rod shaft 31 moves in an axial direction as described above. Accordingly, a frictional force is not generated from friction generating assembly 36 provided at the end of push rod shaft 31.

In addition, when solenoid 41 is turned off and an axial force applied from by spring 35 is applied to push rod shaft 31, push rod shaft 31 is constrained in elastic contact part 39. That is, since the elastic modulus of elastic contact part 39 is larger than that of spring 35, elastic contact part 39 constrains the movement of push rod shaft 31 in the axial direction.

Subsequently, when the braking function is completely implemented, an axial reaction force generated from wheel disk 5 against the pads is transmitted to push rod shaft 31. Accordingly, friction generating assembly 36 generates a strong frictional force by using movable frictional part 37 and stationary frictional part 38, which come in contact with each other.

Figure 6B:
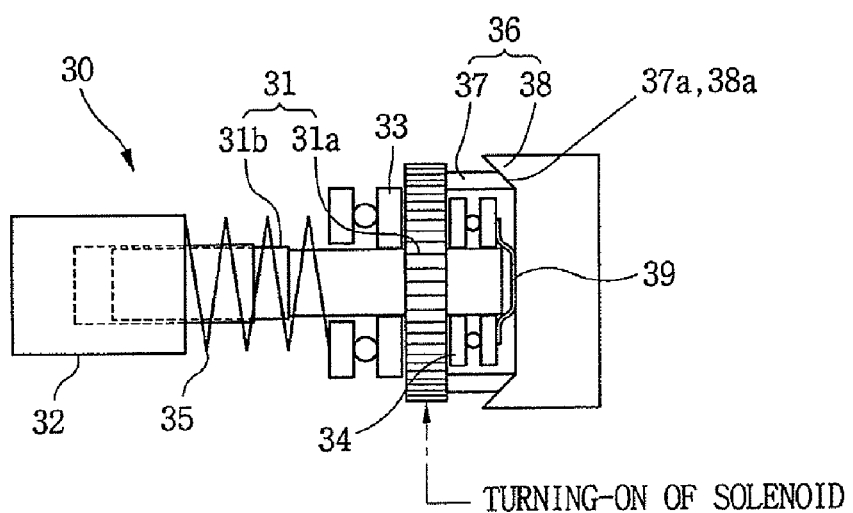

That is, stationary frictional part 38 formed on wedge base plate 20 is moved toward movable frictional part 37, which is positioned on push rod shaft 31, due to the axial reaction force applied from the pads. Accordingly, as shown in FIG. 6B, the inclined frictional contact surface 37a of movable frictional part 37 comes in close contact with frictional contact surface 38a of stationary frictional part 38. As a result, a strong frictional force is generated.

In this case, while being elastically deformed, elastic contact part 39 protruding from the end of push rod shaft 31 comes in contact with the inner portion of stationary frictional part 38.

Accordingly, constraining torque Tf for preventing push rod shaft 31 from rotating by a frictional force is generated in friction generating assembly 36. This means that a frictional force is converted into a force for constraining push rod shaft 31. After braking is completely performed, the friction generating assembly is turned on by ECU 2 and reduces a load of solenoid 41 that constrains push rod shaft 31 by using switching lever 43.

As shown in FIG. 3B, constraining torque Tf, which is generated from a frictional force in friction generating assembly 36, is calculated by the following equation. Since the constraining torque can be calculated by substituting parameters with design values, an actual calculated value of the constraining torque will be omitted.

$$Fr = \Delta Fn / \sin a \quad (1),$$

$$Tf = \mu(\Delta Fn / \sin a) Rf \quad (2)$$

$$\Delta T = \Delta Fn(\tan \alpha - \tan \beta) Rf \quad (3)$$

where, a indicates an angle where a frictional surface is generated, Rf indicates an effective radius of the friction surface, $\Delta Fn$ indicates an axial force to be additionally applied after a spring applies a force, Fr indicates a normal force (reaction force) to be applied to the friction surface, Tf indicates torque to be applied in a direction where rotation is prevented by a frictional force, $\Delta T$ indicates torque causing the rotation by an additional force, and $\mu$ indicates a friction coefficient of the friction surface.

Meanwhile, various additional functions of the EWB are implemented by adjusting unit 30, which is positioned at the central portion of wedge braking unit 16 and includes an NSL type screw interlocked with solenoid 41. The various additional functions will be classified and described below.

When wheel jamming of wedge roller 19 occurs or motor 13 malfunctions in the braking state, the Fail-Safe function releases the pressing of wedge braking unit 16. First, the Fail-Safe function will be described. ECU 2 turns off solenoid 41 and releases the constraint on adjusting unit 30. Accordingly, a force, which is applied to wheel disk 5 by the pad and wedge braking unit 16, is released to prevent a vehicle from abnormally behaving due to an undesired braking force.

Figure 7A:
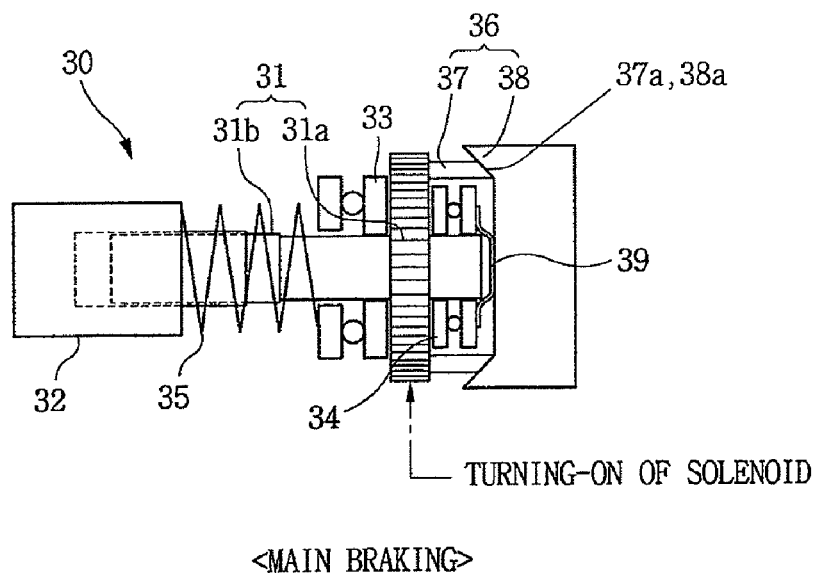
FIGS. 7A and 7B are views illustrating Fail-Safe of the single motor electronic wedge brake system according to the embodiment of the present invention.

That is, as shown in FIG. 7A, switching lever 43 is engaged with latch 31a of push rod shaft 31, so that solenoid 41 turned on in a normal braking state constrains push rod shaft 31. Accordingly, push rod shaft 31 supports wedge roller 19, which is in the braking state. For this reason, a wedge effect of wedge roller 19 where an input force pressing wheel disk 5 is generated is not released and a braking state is maintained.

In this case, friction generating assembly 36 provided at the end of push rod shaft 31, which is moved in an axial direction to the maximum extent, is maintained so that movable frictional part 37 comes on contact with stationary frictional part 38.

Figure 7B:
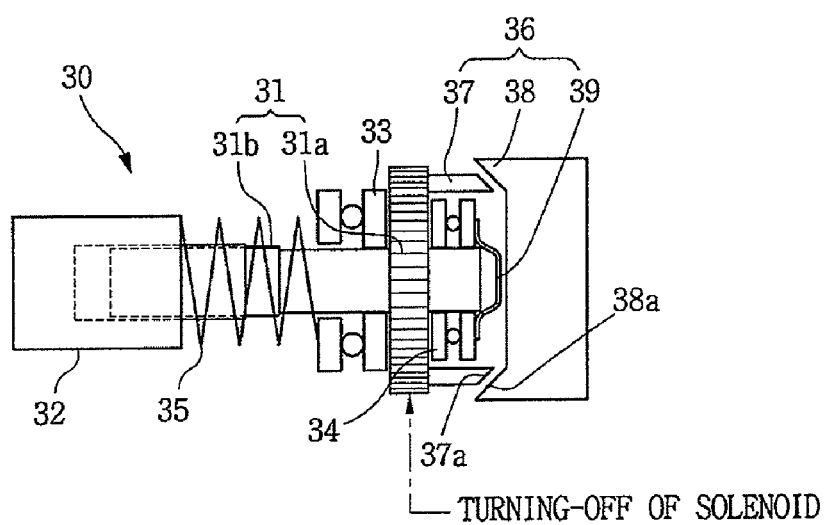

However, if ECU 2 perceives the malfunction of motor 13 or wheel jamming, ECU 2 turns off solenoid 41 to separate switching lever 43 from latch 31a and releases the constraint of push rod shaft 31, as shown in FIG. 7B, even though ECU 2 perceives as a Fail-Safe state.

When the constraint of push rod shaft 31 is released, push rod shaft 31 moves backward due to an axial reaction force applied from the pads. Further, movable frictional part 37 and stationary frictional part 38 of friction generating assembly 36, which is provided at the end of push rod shaft 31, are separated from each other.

That is, a reaction force, which is transmitted through inner pad 7 and wedge moving plate 17 and wedge roller 19 and wedge base plate 20, is applied to push rod shaft 31. Accordingly, push rod shaft 31 releases the wedge effect of wedge roller 19 for maintaining the braking force between the pad and wheel disk 5. Accordingly, the state of a vehicle is converted into a Fail-Safe state where undesired braking is abnormally performed during the braking.

Figure 8:
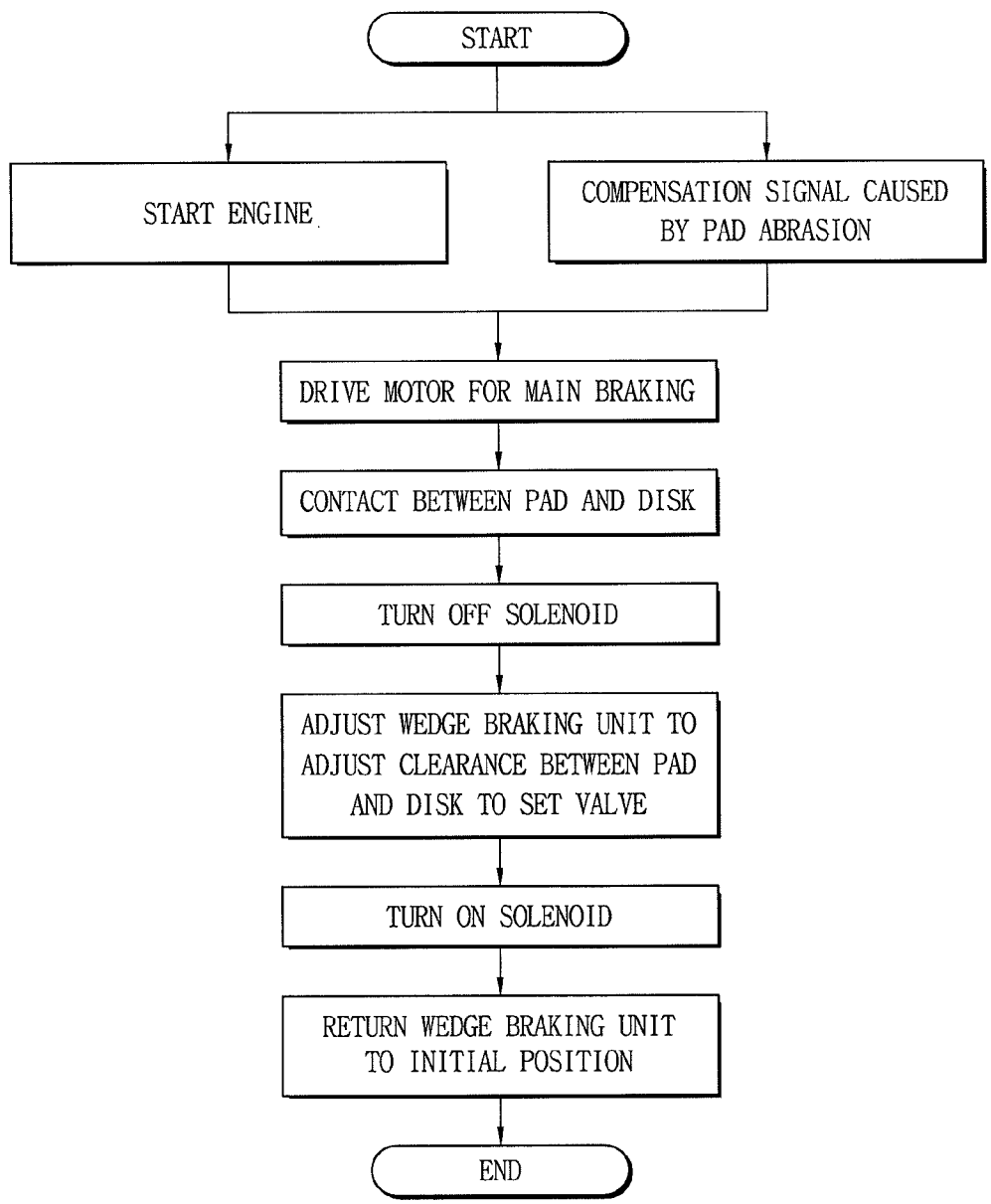
FIG. 8 is a flowchart illustrating a compensating operation while a set clearance of a pad according to the embodiment of the present invention is maintained.

Meanwhile, the function for maintaining a set clearance of a pad among various additional functions implemented by the EWB is a function for always maintaining a clearance that is set between the pad and wheel disk 5 at the initial assembling, and may be implemented in various ways shown in FIG. 8. For example, the function for maintaining a set clearance may be implemented in the following manner. That is, an adjustment for maintaining the set clearance is performed by adjusting a clearance between the pad and wheel disk 5 whenever an engine is started. Alternatively, ECU 2 detects pad abrasion and compensation is then performed to maintain a set clearance between the pad and wheel disk 5.

When the adjustment for maintaining an initial set clearance between wheel disk 5 and the pad is performed in the starting of the engine, the engine is started and ECU 2 drives motor 13. As shown in FIG. 9, the drive of motor 13 causes wedge moving plate 17 to move due to linear motion converter 14, interlocking rod 15, and connecting rod 18, like the main braking. Therefore, inner and outer pads 7 and 8 come in close contact with both surfaces of wheel disk 5.

That is, if wedge moving plate 17 of wedge braking unit 16 is moved together with inner pad 7 by the driving force of motor 13, as shown in FIG. 9A, wedge roller 19 positioned between rolling contact surfaces 17a and 20a is moved by the frictional force between wedge moving plate 17 and the wedge base plate. Due to the movement of wedge moving plate 17, inner and outer pads 7 and 8 come in close contact with the both surfaces of wheel disk 5.

When inner and outer pads 7 and 8 come in close contact with the both surfaces of wheel disk 5 as described above, clearances between inner and outer pads 7 and 8 and wheel disk 5 do not exceed the set clearance. Therefore, as shown in FIG. 9B, ECU 2 turns off solenoid 41 and then releases the solenoid constraining force of push rod shaft 31.

The release of the constraining force of push rod shaft 31 allows push rod shaft 31, which is an NSL type screw, to move I an axial direction. That is, while push rod shaft 31 is loosened from supporting nut 32 by the axial moving force that is applied by spring 35 provided between supporting nut 32 and push rod shaft 31, push rod shaft 31 is moved forward.

Push rod shaft 31 is moved forward until the push rod shaft protrudes from supporting nut 32 by a distance A. The distance A is a clearance required for push rod shaft 31 to come in contact with and support wedge base plate 20 so that inner and outer pads 7 and 8 coming in close contact with the both surfaces of wheel disk 5 are maintained. The distance A is changed depending on the specification of the single motor electronic wedge brake.

Push rod shaft 31 is constrained by elastic contact part 39, which has an elastic modulus larger than spring 35 provided on push rod shaft 31, in the axial direction. For this reason, as shown in FIG. 9B, while wedge base plate 20, wedge roller 19, and wedge moving plate 17 are operated, friction generating assembly 36 is not operated.

In this case, ECU 2 drives motor 13 again in order to move wedge moving plate 17 so that the set clearance is ensured between the pads and wheel disk 5.

When a clearance between the pad and wheel disk 5 is larger than the set clearance, ECU 2 drives motor 13 (referred to as normal rotation) to further move wedge moving plate 17 so that the clearance between the pad and wheel disk 5 corresponds to the set clearance.

However, when the clearance between the pad and wheel disk 5 is smaller than the set clearance, ECU 2 drives motor 13 (referred to as reverse rotation) to pull wedge moving plate 17 (movement in an opposite direction to the moving direction at the braking) so that the clearance between the pad and wheel disk 5 corresponds to the set clearance.

The control of the drive of motor 13, which is performed by ECU 2, allows the clearance between the pad and wheel disk 5 to always correspond to the set clearance whenever the adjustment is performed.

Subsequently, ECU 2 turns on solenoid 41 and allows switching lever 43 to be engaged with latch 31a so that the state of push rod shaft 31, which is moved forward by a distance A, is converted into the stationary state as shown in FIG. 9C.

In this case, movable frictional part 37 and stationary frictional part 38 of friction generating assembly 36, which is provided at the end of push rod shaft 31, are separated from each other and maintained in this state. This state is a state before solenoid 41 is turned on.

After the state of push rod shaft 31 is converted into a stationary state by solenoid 41 as described above, ECU 2 converts the states of wedge base plate 20, wedge roller 19, and wedge moving plate 17 into the initial states by driving motor 13 in the reverse direction. Accordingly, clearances between inner and outer pads 7 and 8 and wheel disk 5 do not exceed the set clearance. Therefore, it is possible to maintain a constant braking force by the wedge effect of wedge roller 19, which is implemented during the braking.

The starting of the engine and processes for maintaining a clearance of a pad are not performed at the same time. Further, when ECU 2 perceives pad abrasion, processes for maintaining a clearance are also similarly performed. However, except for only whether the starting of the engine and the drive of motor 13 are performed at the same time, all of the processes are similarly performed by procedures shown in FIGS. 8 and 9A to 9C. Therefore, the descriptions thereof will be omitted.

Meanwhile, since the state of solenoid 41 is converted into a turning-off state, the function for maintaining braking, which is implemented by the EWB during the operation of the electric parking brake, is implemented by constraining push rod shaft 31 with EPB spring 50.

That is, when ECU 2 perceives the conversion into the park braking state (a method of transmitting a signal to the ECU by using a button or methods similar thereto are used), ECU 2 turns off solenoid 41 to allow switching lever 43 to be separated from latch 31a, thereby releasing the constraint of push rod shaft 31.

As the constraint is released by solenoid 41 as described above, push rod shaft 31 to which the force of spring 35 is applied is loosened from supporting nut 32 and moved forward. The forward movement of push rod shaft 31 causes rear bearing 34 to push wedge base plate 20. Accordingly, wedge moving plate 17 at which wedge roller 19 is positioned and inner pad 7 fixed thereto are pushed against the disk 5.

In this case, as push rod shaft 31 moves backward in the axial direction, movable frictional part 37 and stationary frictional part 38 of friction generating assembly 36 provided at the end of push rod shaft 31 are separated from each other.

Subsequently, when the pad and wheel disk 5 come in contact with each other due to the forward movement of push rod shaft 31 that is caused by the turning-off of solenoid 41, ECU 2 drives motor 13 to implement an operation corresponding to the main braking as shown in FIG. 10A.

That is, if wedge moving plate 17 is moved by the sequential operations of linear motion converter 14, interlocking rod 15, and connecting rod 18, which are caused by the drive of motor 13, wedge moving plate 17 pushes inner pad 7 against wheel disk 5.

As wedge moving plate 17 is moved as described above, wedge roller 19 is moved by wedge moving plate 17 and a frictional force. The movement of wedge roller 19 generates an input force pressing wedge moving plate 17 against wheel disk 5.

Figure 10B:
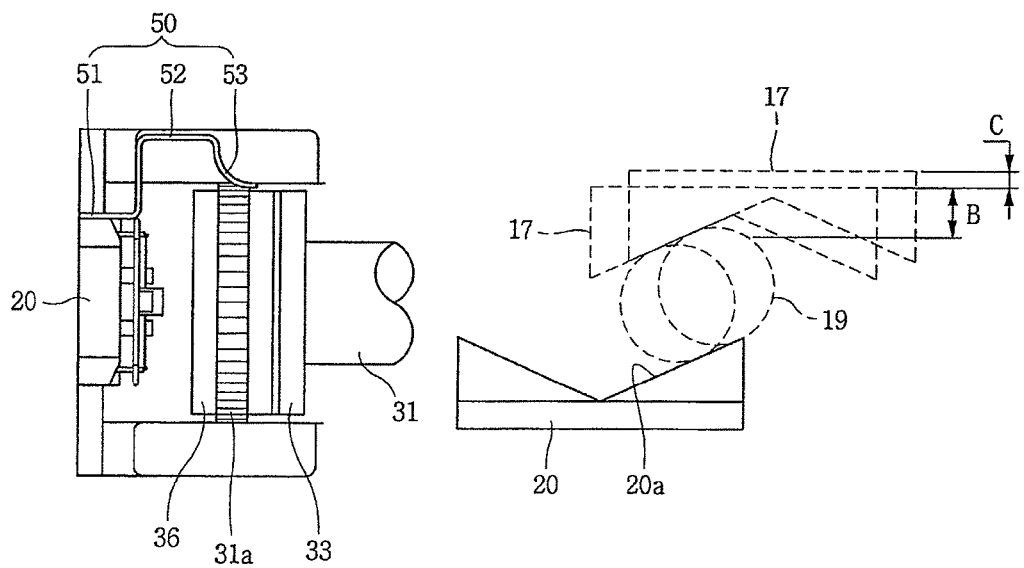

As shown in FIG. 10B, the movement of wedge roller 19 causes wedge moving plate 17, which has been moved by a distance B by push rod shaft 31, to be further moved by a distance C. Accordingly, inner pad 7 fixed to wedge moving plate 17 presses the disk 5. As a result, a park braking force is generated.

The wedge moving plate is further moved during the park braking, as compared to the main braking. That is, for example, a moving distance B of wedge moving plate 17, which is moved due to the movement of wedge roller 19, is 2 mm to the maximum at the main braking. Further, a moving distance C of wedge moving plate 17 is larger than the moving distance B by 0.8 mm at the park braking, and a park braking force is maintained. The additional movement is caused by the axial movement of wedge moving plate 17, which is moved by motor 13.

In this case, the above-mentioned distance (2 mm or 0.8 mm) is different depending on the design specification of the wedge caliper. The value of the distance is not limited to a specific value, and is only an example.

As described above, the pad is further moved by motor 13 to perform the park braking, and push rod shaft 31 is also moved forward. Then, push rod shaft 31, which is moved forward, maintains a constraining force by EPB spring 50 instead of solenoid 41 that is turned off.

That is, if EPB spring 50 is moved together with wedge moving plate 17 that is moved by motor 13, press portion 53 of EPB spring 50 is positioned on latch 31a of push rod shaft 31.

The movement of EPB spring 50 allows press portion 53 to press latch 31a by its own elastic force. Further, push rod shaft 31, to which a constraining force is not applied by solenoid 41, is constrained again by the force of EPB spring 50. Accordingly, the movement of push rod shaft 31 is constrained, thereby maintaining the braking force generated due to the operation of the parking brake.

When push rod shaft 31 is constrained by the operation of EPB spring 50, friction generating assembly 36 provided on push rod shaft 31 is maintained so that movable frictional part 37 and stationary frictional part 38 are separated from each other.

What is claimed is:

1. A single motor electronic wedge brake system generating solenoid assisting force, comprising:
    an ECU that receives vehicle information signals; and
    a plurality of wedge actuator assemblies, wherein each wedge actuator assembly comprises:
    a wedge structure, having a wedge roller, a wedge moving plate, and a wedge base plate, the wedge structure being self-energizing by using the wedge roller when inner and outer pads of a wedge caliper are pressed against a wheel disk by using power generated from a motor, the motor being driven by an electronic pedal used to brake a vehicle and the ECU,
    the wedge roller implementing a wedge operation between the wedge moving plate, which moves the inner pad to the wheel disk, and the wedge base plate provided on a side opposite to the wedge moving plate, by using an axial linear motion converted from torque of the motor controlled by the ECU, wherein opposing surfaces of the wedge moving plate and the wedge base plate are both V-shaped, and wherein the wedge roller is configured to move from a central portion of the V-shaped opposing surfaces to an outside of the V-shaped opposing surfaces;
    a NSL (Non-Self Locking) push rod shaft that supports an axial reaction force transmitted from the inner and outer pads during operation, the push rod shaft having first and second ends;
    a solenoid that is controlled by the ECU so as to constrain or release the push rod shaft;
    a solenoid mechanism that includes the push rod shaft, which is positioned at the base plate and has NSL threads screwed to a supporting nut having NSL threads together with a push rod shaft spring in order to support an axial reaction force transmitted from the inner and outer pads, and a switching lever, configured to engage or separate from a latch of the push rod shaft in order to constrain or release an axial movement of the push rod shaft as the solenoid is controlled by the ECU;
    a friction generating assembly that is provided at the first end of the push rod shaft, moves together with the push rod shaft moving in an axial direction so that an axial reaction force transmitted from the inner and outer pads is dispersed by the push rod shaft, and generates a frictional force for supporting an axial reaction force by using the push rod shaft when the axial reaction force transmitted from the inner and outer pads to the wedge base plate is applied to the friction generating assembly, and the wedge structure is provided at a periphery of the friction generating assembly and at the first end of the push rod shaft; and
    an EPB (Electric Parking Brake) spring that presses and constrains the push rod shaft of an adjusting unit to maintain a braking performance during operation of an electric parking brake.

2. The electronic wedge brake system as defined in claim 1, wherein the friction generating assembly includes:
    a movable frictional part that protrudes from a rear surface of the latch formed on the push rod shaft, so as to form a hollow shape;
    a stationary frictional part that protrudes from a wedge braking unit and comes in contact with the movable frictional part so as to generate a frictional force; and
    an elastic contact part that comes in contact with the stationary frictional part, is pressed against the stationary frictional part, and is deformed elastically when the push rod shaft supports an axial reaction force.

3. The electronic wedge brake system as defined in claim 2, wherein the movable frictional part is inserted into a recess formed in the stationary frictional part, and an outer periphery of the movable frictional part comes in contact with an inner periphery of the stationary frictional part in order to generate a frictional force.

4. The electronic wedge brake system as defined in claim 3, wherein contact surfaces of the movable frictional part and the stationary frictional part are formed of inclined frictional contact surfaces.

5. The electronic wedge brake system as defined in claim 4, wherein a plurality of grooves is formed on the frictional contact surface of the movable frictional part.

6. The electronic wedge brake system as defined in claim 2, wherein a thrust bearing provided at the first end of the push rod shaft is received in a space formed in the movable frictional part.

7. The electronic wedge brake system as defined in claim 2, wherein the stationary frictional part is integrally formed with the wedge base plate that is arranged on the wedge moving plate, which performs the wedge operation, together with the wedge roller.

8. The electronic wedge brake system as defined in claim 2, wherein the elastic contact part is fixed to the bearing, which is provided at the first end of the push rod shaft, in the movable frictional part.

9. The electronic wedge brake system as defined in claim 8, wherein a central portion of the elastic contact part is bent to protrude from the both ends thereof.

10. The electronic wedge brake system as defined in claim 8, wherein an elastic modulus of elastic contact part is larger than that of the push rod shaft spring, which is provided on the push rod shaft and pushes the push rod shaft in the axial direction.

11. The electronic wedge brake system as defined in claim 8, wherein the elastic contact part is a push washer elastic contact part fixed to the first end of the push rod shaft.

12. The electronic wedge brake system as defined in claim 1, wherein a stationary frictional part of the friction generating assembly is provided on the wedge base plate and a movable frictional part of the friction generating assembly is provided on the latch of the push rod shaft at the first end of the push rod.

* * * * *